March 31, 1970  B. H. BAHER  3,503,462
ACCESSORY WALL RACK AND TANK SCALE
Filed Oct. 2, 1968  2 Sheets-Sheet 1
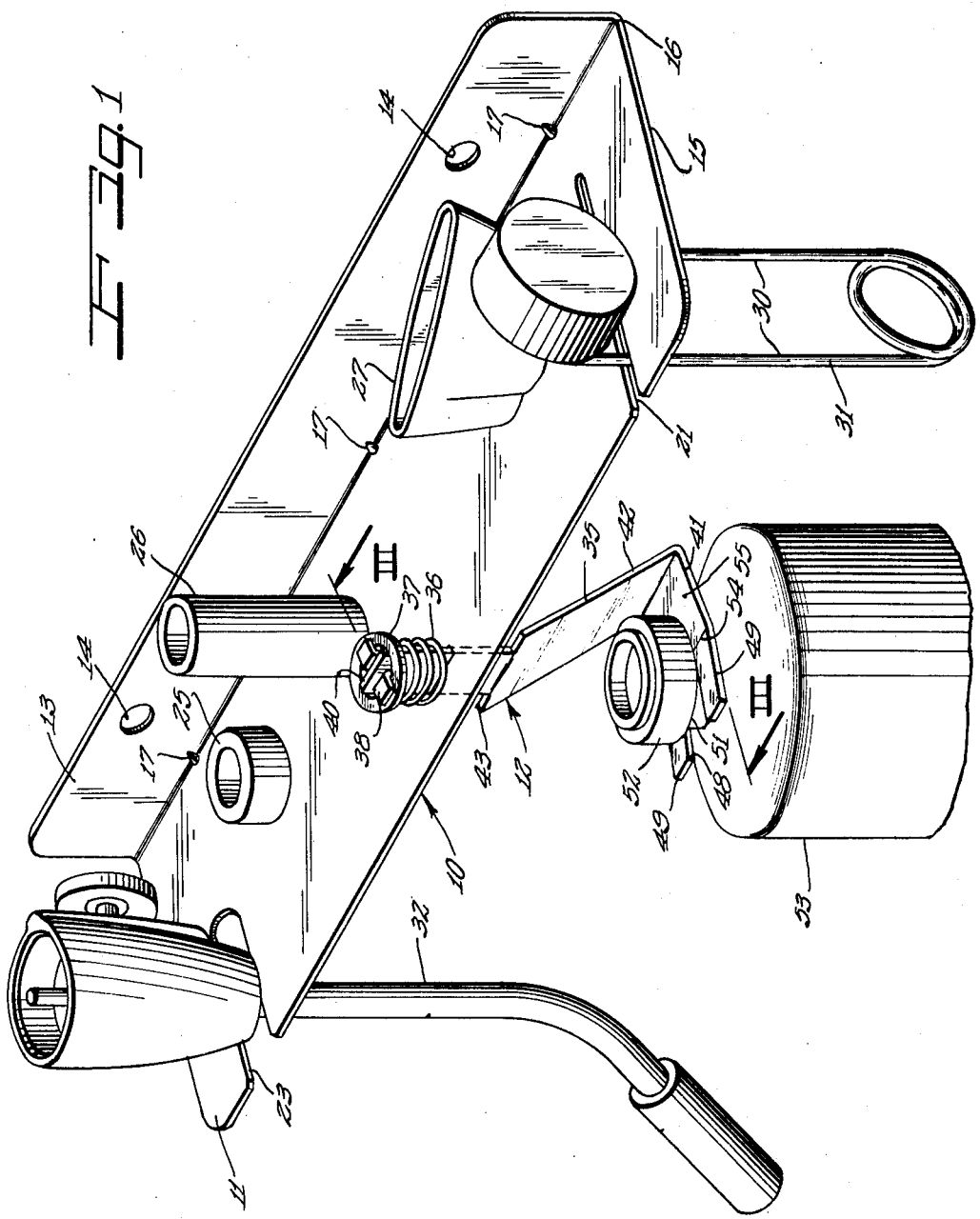
INVENTOR.
Bernard H. Baher
BY  ATTORNEYS

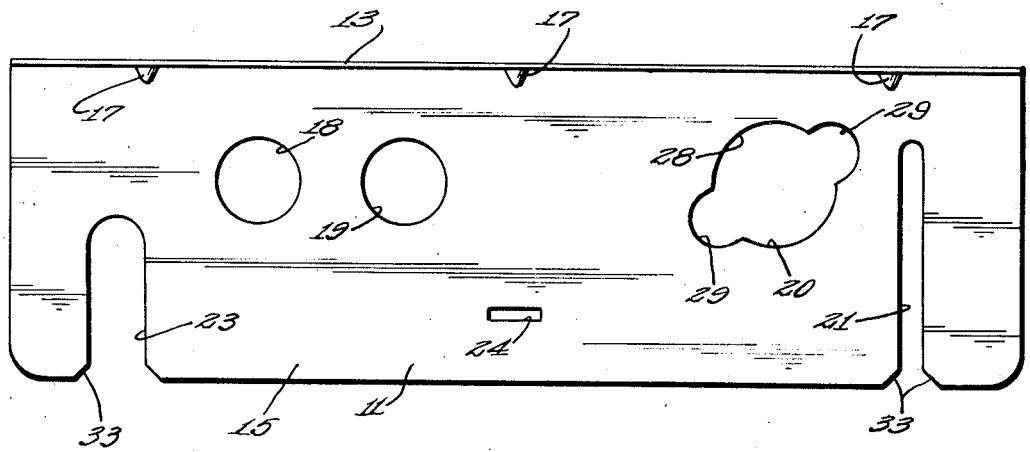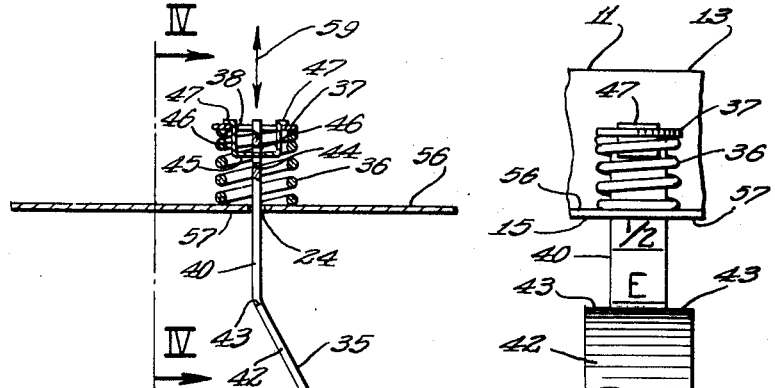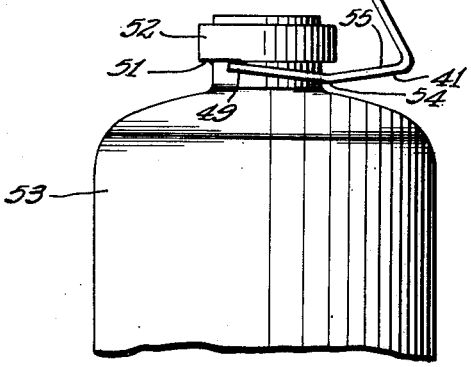

United States Patent Office 3,503,462
Patented Mar. 31, 1970

3,503,462
ACCESSORY WALL RACK AND TANK SCALE
Bernard H. Baher, 52 E. High St.,
Avon, Mass. 02322
Filed Oct. 2, 1968, Ser. No. 764,388
Int. Cl. G01g 3/02, 19/52
U.S. Cl. 177—144                    7 Claims

ABSTRACT OF THE DISCLOSURE

A wall rack including a tank scale for storing accessories of a propane torch kit and for weighing the propane tank having a rack portion provided with apertures for receiving torch burner tips and having one slot for receiving the torch valve assembly and the other slot for receiving a torch igniter. The wall rack supports a scale for weighing a propane container or tank which scale is supported by the rack and utilizes a portion of the rack as an indicator for the determination of the weight of the container.

BACKGROUND OF THE INVENTION

Field of the invention

This invention pertains to a wall rack for propane torch accessories and in particular a wall rack which supports a scale for weighing a container.

Prior art

Propane torches which are mounted on a disposable propane container or tank have been introduced into the market in the past few years. Many of the propane torches are sold in a kit which contains an igniter for lighting the torch and a plurality of burner or torch tips which are used on the torch to enable the performance of various specific jobs with the torch. The kits are sometimes sold with a storage box which has spaces provided for receiving the tips and accessories and a space for carrying at least one propane container.

SUMMARY OF THE INVENTION

The present invention is directed to a rack which is provided with openings for receiving burner tips and torch accessories so that they can be stored in an out-of-the-way portion of the workshop area and yet remain readily available for use. The rack further includes a calibrated spring scale assembly for storing a propane container which scale assembly provides a gauge of the amount of fuel in the container.

Accordingly it is the object of the present invention to provide a wall rack for storage of a torch fuel tank and torch attachments.

Another object of the present invention is to provide a wall rack which supports a fuel gauge which indicates the amount of fuel in the fuel tank.

On the drawings:

FIGURE 1 is an isometric drawing of the tool storage rack of the present invention with the various torch accessories, the tank and the torch supported thereon;

FIGURE 2 is a plan view of the rack with the scale assembly removed illustrating the structural configuration of the rack;

FIGURE 3 is a partial cross section with some parts in elevation taken along the lines III—III of FIGURE 1; and FIGURE 4 is a partial view taken from lines IV—IV of FIGURE 3.

As shown on the drawings:

The principles of this invention are particularly useful embodied in a propane fuel gauge and tool rack generally indicated at 10. The tool rack comprises a bracket 11 which supports a scale means or assembly generally indicated at 12.

The bracket 11 which is preferably a one-piece metal stamping has a back portion 13 provided with apertures 14 which may receive fastening means such as screws or nails for securing the bracket 11 to a wall surface. Extending outwardly from the back portion 13 at a right angle is a platform portion 15. Along the bend line 16 between the back portion 13 and the platform portion 15, a plurality of embossments or indentations 17 are provided to increase the rigidity and strength of the bent portion of the bracket 11.

As best illustrated in FIGURE 2, the platform portion 15 is provided with a plurality of openings which include round or circular apertures 18 and 19, an elongated aperture 20, slots 21 and 23 which extend inwardly from an edge of the platform portion 15 and an elongated slot 24. The round or circular apertures 18 and 19 are adapted to receive and support torch or burner tips such as 25 and 26 (FIG. 1) in an upright position. A flame spreader 27 is received and supported in an upright position in the elongated opening 20 which, as illustrated in FIG. 2, has a circular portion 28 and a pair of diametrically opposite wing portions 29, 29. The slot 21 which extends inwardly from an edge of the platform portion 15 has a narrow width which provides space for receiving the spring legs 30 of an igniter 31 for the propane torch. The slot 23 has a larger width so it can receive a valve and torch assembly 32. Both slots 21 and 23 are provided with lead-in surfaces 33, 33 to facilitate the insertion into the respective slots of the igniter 31 or the torch valve and burner assembly 32.

The scale means or assembly 12 includes a hook-shaped hanger 35, a spring 36, and an interconnecting means comprising a washer 37, and a U-shaped retainer 38. The hanger 35 is preferably a one-piece metal stamping that has been bent during its formation to define an extension 40, which is interconnected to a container engaging portion 41 by an intermediate portion 42.

As best illustrated in FIG. 4, the intermediate portion 42 has a greater width than the width of the extension 40, which is provided with gauging indicia. The junction of the extension 40 and intermediate portion 42 defines a pair of abutments or shoulders 43, 43. As best illustrated in FIG. 3, the hanger 35 has been bent adjacent the shoulders 43, 43 so that the intermediate portion 42 lies in a plane offset from the plane of the extension 40 by approximately 30°. The extension 40 at an end opposite the shoulders 43, 43 is provided with an opening or aperture 44 for receiving a bottom leg or portion 45 of the retainer 38 which has side legs 46, 46, each of which terminates in an outwardly extending projection or tab 47.

The container engaging portion 41, which has been bent from the intermediate portion 42 to extend transversely to the plane of the extension 40, has an enlarged slot 48 which defines a pair of fingers 49, 49 for engaging a bottom surface 51 of a threaded neck or bung 52 of a propane container to tank 53. To prevent the tank 53 from slipping off the fingers 49, 49, each of the fingers 49, 49 is preferably bent upward at 54 to provide a slight inclination of approximately 10° to the remaining portion 55 of the engaging portion 41.

The scale assembly 12 is detachably mounted on the bracket 11 with the extension 40 of the hanger 35 extending through the slot 24, and the scale assembly 12 is held in the mounted position by the spring 36 and the interconnecting means. The spring 36 is telescopically disposed on the extension 40 to act between an upper surface 56 on the platform portion 15 and the washer 37 which is held on the extension 40 by the tabs 47, 47 of the retainer 38 which is disposed in the aperture 44. When the hanger 35 is not supporting the tank 53, the lifting force of the spring 36 urges the shoulders 43, 43 into contact with the bottom surface 57 of the platform portion 15.

When the tank of fuel such as 53 is supported on the hanger 35, the spring 36 is compressed a distance which depends upon the amount of fuel in the tank, and the amount of fuel in the tank 53 can be gauged by observing the alignment of the indicia on the extension 40 with respect to the platform portion 15. Since the hanger 35 is bent into a hook shape with the intermediate portion 42 being offset, the center of gravity of the tank 53 is disposed in a position beneath the platform portion 15. The coaction between the lifting force of the spring 36 and the position of the center of gravity of the tank 53 is such that the extension 40 is maintained in a substantially vertical plane, and, therefore, is free to move in the slot 24 in the direction indicated by arrow 59.

Although the dimension of the apertures 18, 19 and 20 along with the slots 21 and 23 are usually preselected to receive standard accessories and components of a propane torch kit, the number, dimensions and/or shape of the openings could be changed during the manufacturing of the bracket 11 to receive the desired number and type of accessories or components.

I claim as my invention:

1. A wall rack for receiving and storing accessories for a propane torch set including a propane container, propane torch valve assembly and other components, said rack comprising:
a one-piece bracket having a back portion adapted to be secured to a wall surface and a platform portion extending at right angles to the back portion, said platform portion being provided with openings, at least one of said openings being a slot extending inwardly from an edge of said platform and being of a size to receive and support the propane torch assembly, and at least one of said openings being an aperture in said platform portion for receiving and supporting a component such as a torch tip; and
container support means supported by said platform portion for receiving and supporting a propane container.

2. A wall rack according to claim 1, wherein one of said openings is an elongated aperture with a major and minor dimension for receiving and supporting a flame spreader.

3. A wall rack according to claim 1 wherein said container support means is a scale means supported by said platform of said bracket and indicating the amount of fuel in a propane container received and supported thereon.

4. A wall rack according to claim 3, wherein said scale means includes a hanger member for receiving the propane container, a spring for resiliently supporting said hanger member on said platform of said bracket and means for interconnecting said spring and hanger together.

5. A rack according to claim 4 wherein said hanger member has a shoulder and an extension adjacent thereto, wherein said platform portion has a slot for slidably receiving said extension with said hanger being detachably mounted on said platform with the extension in said slot and said spring acting between said extension and an upper surface of the platform portion to urge said shoulder towards contact with the bottom surface of the platform portion whereby the position of said extension with respect to said platform indicates the amount of propane in said container.

6. A wall rack according to claim 4 wherein said hanger includes an extension, a container engaging portion extending substantially at right angles to a plane of the extension, and an intermediate portion extending therebetween in a plane intersecting said extension at an offset angle so that the center of the weight of the propane container supported on said engaging portion causes the extension to remain in substantially a vertical plane.

7. A wall rack according to claim 6 wherein said connecting means includes a washer and a retainer, said spring being telescopically disposed on said extension and engaging said washer and an upper surface of the platform portion, with said retainer engaging said washer to transfer the upward lifting force of the spring to the extension of said hanger.

References Cited

UNITED STATES PATENTS

| | | | |
|---|---|---|---|
| 418,435 | 12/1889 | Besse. | |
| 1,217,334 | 2/1917 | Nelson | 177—233 |
| 1,897,169 | 2/1933 | Thomas | 177—132 XR |
| 2,152,247 | 3/1939 | Endacott | 177—132 XR |
| 2,670,194 | 2/1954 | Hansson | 177—245 XR |
| 2,693,864 | 11/1954 | Ferro | 177—232 XR |
| 2,974,804 | 3/1961 | Maro. | |
| 2,139,634 | 12/1938 | Heigis | 177—164 XR |

FOREIGN PATENTS

| | | |
|---|---|---|
| 581,414 | 8/1959 | Canada. |
| 8,837 | 1890 | Great Britain. |

ROBERT S. WARD, JR., Primary Examiner

U.S. Cl. X.R.

177—232, 245